(12) United States Patent
Hirata

(10) Patent No.: US 7,907,335 B2
(45) Date of Patent: Mar. 15, 2011

(54) FOCUS-ADJUSTING UNIT AND MICROSCOPE

(75) Inventor: Tadashi Hirata, Tokyo (JP)

(73) Assignee: Olympus Corporation, Tokyo (JP)

( * ) Notice: Subject to any disclaimer, the term of this patent is extended or adjusted under 35 U.S.C. 154(b) by 66 days.

(21) Appl. No.: 12/389,875

(22) Filed: Feb. 20, 2009

(65) Prior Publication Data

US 2009/0219612 A1    Sep. 3, 2009

(30) Foreign Application Priority Data

Feb. 28, 2008   (JP) ................. 2008-048763

(51) Int. Cl.
*G02B 7/04* (2006.01)
*G02B 21/00* (2006.01)

(52) U.S. Cl. ......... 359/383; 359/368; 359/684; 359/692
(58) Field of Classification Search .................. 359/379, 359/383, 434, 795; 250/201.2–201.8
See application file for complete search history.

(56) References Cited

U.S. PATENT DOCUMENTS

| | | | | |
|---|---|---|---|---|
| 4,204,748 A * | 5/1980 | Yonekubo | ................... | 359/791 |
| 4,854,686 A * | 8/1989 | Oda | ................... | 359/795 |
| 5,729,385 A * | 3/1998 | Nishida et al. | ................ | 359/434 |
| 6,208,462 B1 * | 3/2001 | Yonetani | .................... | 359/434 |
| 7,550,699 B1 * | 6/2009 | Marshall | ................... | 250/201.4 |
| 7,564,620 B2 * | 7/2009 | Winterot et al. | ............... | 359/381 |
| 7,643,208 B2 * | 1/2010 | Hirata | .................... | 359/379 |
| 2005/0046935 A1 | 3/2005 | Tanaami | | |
| 2006/0098213 A1 * | 5/2006 | Itoh et al. | .................. | 356/632 |
| 2006/0103922 A1 | 5/2006 | Tsuyuki | | |
| 2008/0186551 A1 * | 8/2008 | Hanft et al. | ................. | 359/205 |

FOREIGN PATENT DOCUMENTS

| | | |
|---|---|---|
| JP | 2005-70477 | 3/2005 |
| JP | 2006-079000 | 3/2006 |
| JP | 2006-139181 | 6/2006 |
| WO | WO 0244791 A1 * | 6/2002 |

* cited by examiner

*Primary Examiner* — Mark Consilvio
(74) *Attorney, Agent, or Firm* — Scully, Scott, Murphy & Presser, PC

(57) ABSTRACT

It is possible to use the magnification of an objective lens as is, substantially without changing the observation magnification, even when the working distance of the objective lens is changed. The invention provides a focus-adjusting unit disposed on an optical axis between an objective optical system that collects light from a specimen and an image-forming optical system that images the light collected by the objective optical system at a prescribed position, comprising a front optical system and a back optical system, sequentially disposed along the optical axis direction from a front side, with the objective optical system serving at the front side and the image-forming optical system at the back; and a lens driving part that relatively moves these optical systems in the optical axis direction, wherein the front optical system and the back optical system have refractive powers of different sign and focal lengths of substantially equal absolute value.

5 Claims, 12 Drawing Sheets

SPHERICAL ABERRATION

IMAGE SIDE NA 0.025

-5.00 ———— 5.00

DEF 0.00

ASTIGMATISM

OBJECT HEIGHT 0.4

-2.00 ———— 2.00

FIY 0.40
DEF 0.00

DISTORTION

OBJECT HEIGHT 0.40

-0.10 ———— 0.10

FIY 0.40
DEF 0.00

CHROMATIC ABERRATION OF MAGNIFICATION

OBJECT HEIGHT 0.40

-0.01 ———— 0.01

FIY 0.40
DEF 0.00

656.27 —·—·—
587.56 —··—
546.07 — — —
486.13 - - - - -
435.84 ———

FIG. 13A
SPHERICAL ABERRATION
FIG. 13B
ASTIGMATISM
FIG. 13C
DISTORTION
FIG. 13D
CHROMATIC ABERRATION OF MAGNIFICATION
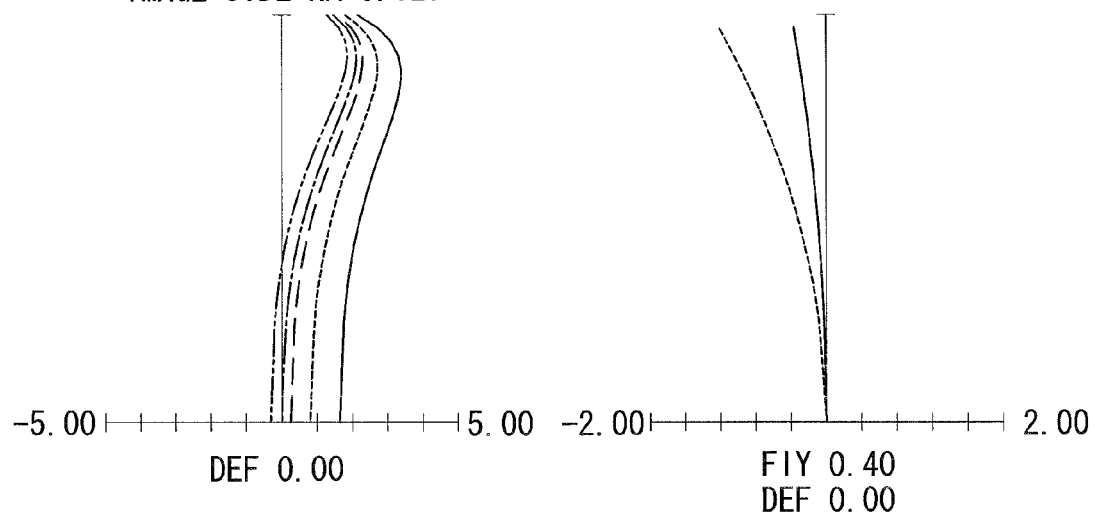
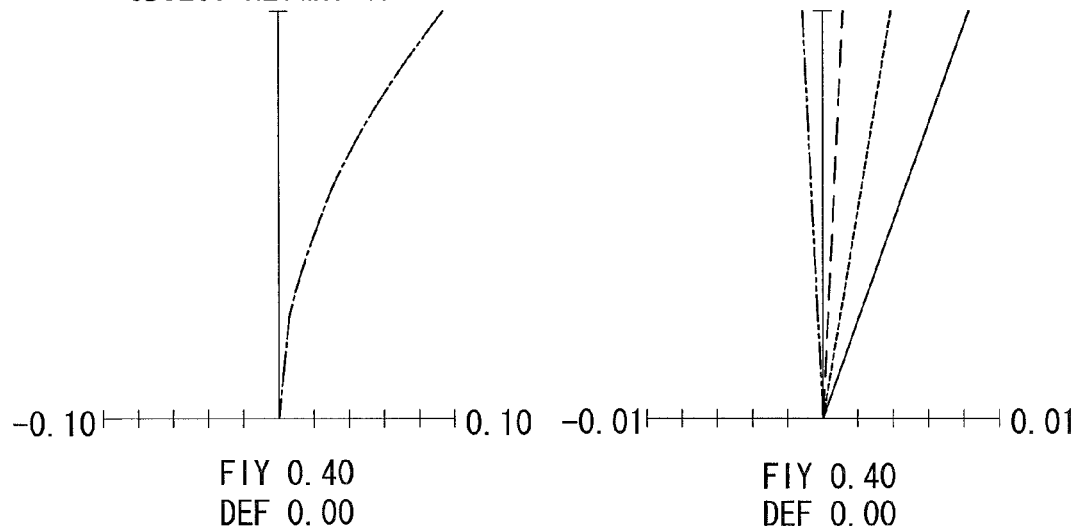

FOCUS-ADJUSTING UNIT AND MICROSCOPE

BACKGROUND OF THE INVENTION

1. Field of the Invention

The present invention relates to a focus-adjusting unit.

This application is based on Japanese Patent Application No. 2008-048763, the content of which is incorporated herein by reference.

2. Description of Related Art

In known microscopes in the related art, optical elements having positive refractive power and negative refractive power are disposed between a light source and an objective lens, and the working distance of the objective lens is changed by varying a physical distance (for example, see Japanese Unexamined Patent Application, Publication No. 2005-70477).

In addition, microscopes in which an adapter lens can be attached to and detached from a finite objective lens have also been disclosed (for example, see Japanese Unexamined Patent Application, Publication No. 2006-79000). With this configuration, by combining a small-diameter finite objective and an adapter lens and by moving the adapter lens in the optical axis direction, the working distance of the objective lens can be changed.

There are also known microscopes in which a finite objective lens can be attached and detached (for example, see Japanese Unexamined Patent Application, Publication No. 2006-139181). With this type, by combining a finite objective with an image-forming lens and by moving the image-forming lens along the optical axis direction, the working distance of the objective lens can be changed.

However, in the microscopes disclosed in these Applications, the positional relationship between the optical system for varying the focus and the objective lens and image-forming lens is not considered at all. Unless the positional relationship of the optical system is considered, if the working distance of the objective lens changes as the lenses constituting the optical system are moved in the optical axis direction, the problem of a significant change in the observation magnification is likely.

BRIEF SUMMARY OF THE INVENTION

The present invention has been conceived in light of the circumstances described above, and an object thereof is to provide a focus-adjusting unit and a microscope in which the magnification of an objective lens can be used as is without substantially changing the observation magnification, even if the working distance of the objective lens changes.

In order to realize the object described above, the present invention provides the following solutions.

The present invention provides a focus-adjusting unit disposed on an optical axis between an objective optical system that collects light from a specimen and an image-forming optical system that images the light collected by the objective optical system at a prescribed position, including a front optical system and a back optical system, sequentially disposed along the optical axis direction from a front side, with the objective optical system at the front side and the image-forming optical system at a back side; and a lens driving part that relatively moves these optical systems in the optical axis direction, wherein the front optical system and the back optical system have focal lengths of different sign and focal lengths of substantially equal absolute value.

With the focus-adjusting unit according to the present invention, when the distance between the front optical system and the back optical system is changed by the lens driving part, it is possible to change the working distance. In this case, because the signs of the focal lengths of the front optical system and the back optical system are different and the absolute values of the focal lengths are substantially equal, it is possible to achieve an observation magnification equal to that in the case where the focus-adjusting unit is not present.

In the above-mentioned focus-adjusting unit according to the invention, conditional expression (1) below is preferably satisfied:

$$Hb1 - Hf2 > 0 \tag{1}$$

Here, Hb1 is a back principal point of the front optical system and Hf2 is a front principal point of the back optical system.

By doing so, even if the front optical system and the back optical system are moved relative to each other by operating the lens driving part, it is possible to avoid interference between the two optical systems.

In the above-mentioned focus-adjusting unit according to the invention, the front optical system may have a positive focal length, and the back optical system may have a negative focal length; and the back optical system may comprise a negative lens group having a negative refractive power and a positive lens group having a positive refractive power, disposed in sequence along the optical axis direction from the front side.

With this configuration, it is possible to make the position of the front principal point of the back optical system take a negative value, thus allowing conditional expression (1) above to be easily satisfied. By making the focal length of the front optical system positive, the front focal point of the front optical system is located towards the front side of the front optical system, and therefore, the space between the front focal point of the front optical system and the back focal point of the objective lens can be reduced, and the change in magnification can thus be reduced even if the working distance changes.

In the above-mentioned focus-adjusting unit according to the invention, at least one of the front optical system and the positive lens group may be a compound lens formed by combining a meniscus lens and a positive lens having positive refractive power.

With this configuration, it is possible to correct chromatic aberrations using the compound lens.

In the above-mentioned focus-adjusting unit according to the invention, preferably the front optical system is a biconvex lens; the negative lens group is a biconcave lens; the positive lens group is a compound lens formed of a biconvex lens and a meniscus lens; and the following conditional expressions (2) and (3) are satisfied:

$$v3 - v4 > 20 \tag{2}$$

$$0.02 < n3 - n4 < 0.1 \tag{3}$$

Here, v3 and v4 are Abbe numbers of the biconvex lens and the meniscus lens in the positive lens group, and n3 and n4 are d-line refractive indexes of the biconvex lens and the meniscus lens in the positive lens group.

With this configuration, spherical aberrations and coma can be corrected with the biconcave lens, and chromatic aberrations can be corrected with the compound lens.

The present invention also provides a microscope including any of the focus-adjusting units described above.

The present invention affords an advantage in that it is possible to use the magnification of an objective lens as is, substantially without changing the observation magnification, even if the working distance of the objective lens is changed.

BRIEF DESCRIPTION OF THE SEVERAL VIEWS OF THE DRAWINGS

FIG. 13A is a diagram showing spherical aberration with the lens arrangement of the focus-adjusting unit according to Example 2 of this embodiment.

FIG. 13B is a diagram showing astigmatism with the lens arrangement of the focus-adjusting unit according to Example 2 of this embodiment.

FIG. 13C is a diagram showing distortion with the lens arrangement of the focus-adjusting unit according to Example 2 of this embodiment.

FIG. 13D is a diagram showing chromatic aberration of magnification with the lens arrangement of the focus-adjusting unit according to Example 2 of this embodiment.

DETAILED DESCRIPTION OF THE INVENTION

A focus-adjusting unit 1 according to a first embodiment of this invention will be described below with reference to FIGS. 1 and 2.

Figure 1:
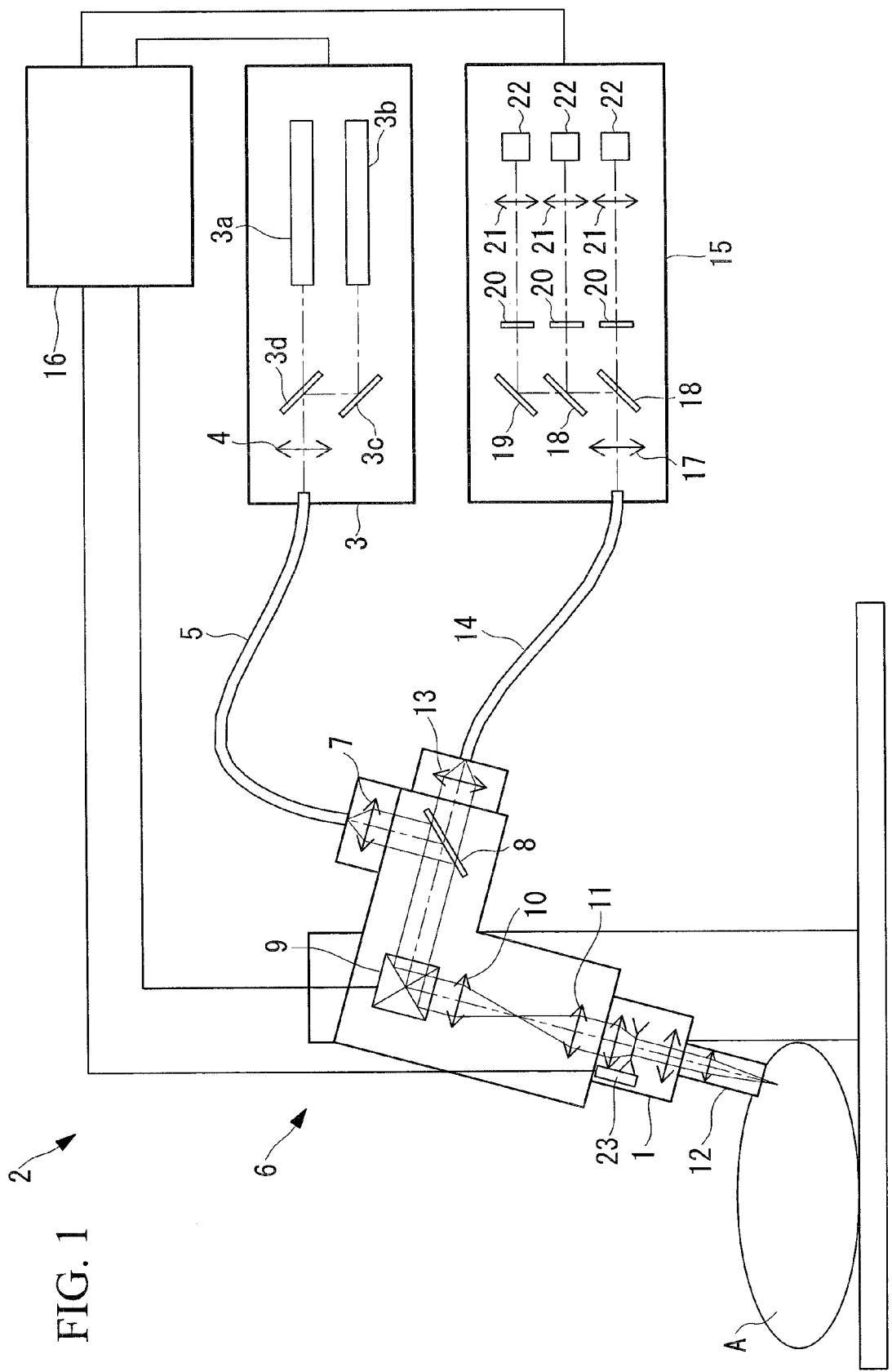
FIG. 1 is a diagram showing the overall configuration of a microscope provided with a focus-adjusting unit according to an embodiment of the present invention.

The focus-adjusting unit 1 according to this embodiment is provided in a microscope 2 shown in FIG. 1. This microscope 2, which is a laser scanning microscope, includes a laser light source 3 that emits laser light, a coupling optical system 4 that focuses the laser light from the laser light source 3, an optical fiber 5 that guides the laser light focused by the coupling optical system 4, and a microscope main body 6 that is connected to the laser light source 3 by the optical fiber 5.

The laser light source 3 includes a plurality of light source 3a and 3b that emit laser light of different wavelengths, a mirror 3c, and a dichroic mirror 3d.

The microscope main body 6 includes a collimator optical system 7 that converts the laser beam emerging from the optical fiber 5 into a substantially collimated beam, a dichroic mirror 8 that deflects the laser light converted to a substantially collimated beam by the collimator optical system 7, proximity galvanometer mirrors 9 that two-dimensionally scan the laser light deflected by the dichroic mirror 8, a pupil-projection optical system 10 that focuses the laser light scanned by the proximity galvanometer mirrors 9, an image-forming optical system 11, and an objective optical system 12, as well as the focus-adjusting unit 1 according to this embodiment, which is disposed between the objective optical system 12 and the image-forming optical system 11.

The microscope 2 also includes a coupling optical system 13, an optical fiber 14, a detection optical system 15, a control unit 16 which controls these components, and a display unit (not illustrated in the drawings). The coupling optical system 13 focuses fluorescence or reflected light from the specimen A, which is collected by the objective optical system 12, returns via the image-forming optical system 11, the pupil-projection optical system 10, and the proximity galvanometer mirrors 9, and is transmitted through the dichroic mirror 8. The optical fiber 14 guides the fluorescence or reflected light from the specimen A which is focused by the coupling optical system 13. The detection optical system 15 detects the fluorescence or reflected light guided by the optical fiber 14. The display unit displays an image of the fluorescence or reflected light detected by the detection optical system 15. The microscope main body 6 can move in three mutually orthogonal axial directions (XYZ) and can rotate about each axis, so that the position and angle of the tip of the objective optical system 12 can be arbitrarily adjusted.

The proximity galvanometer mirrors 9 scan the observation position in directions substantially orthogonal to the optical axis of the objective optical system 12.

Placing the tip of the objective optical system 12 in close contact with the specimen A can reduce blurring of the observed image due to breathing or pulsing of the specimen A.

The detection optical system 15 includes a collimator optical system 17 that converts the fluorescence or reflected light guided by the optical fiber 14 into a substantially collimated beam, a plurality of dichroic mirrors 18 and a mirror 19 that split the light into each wavelength, barrier filters 20, focusing lenses 21, and light detectors 22.

Figure 2:
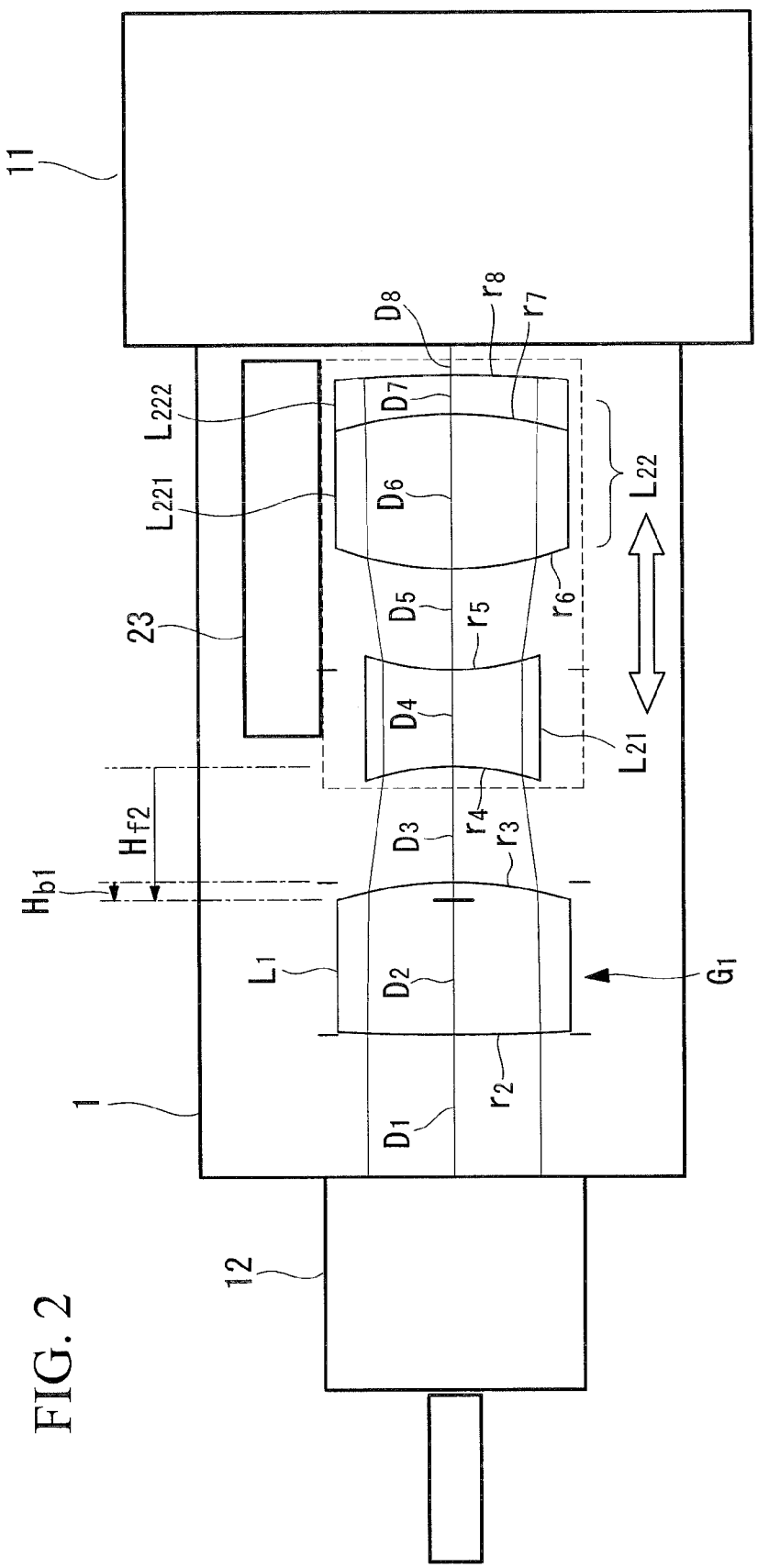
FIG. 2 is a diagram showing a focus-adjusting unit according to a first Example of this embodiment.

As shown in FIG. 2, with the objective optical system 12 at the front and the image-forming optical system 11 at the back, the focus-adjusting unit 1 according to this embodiment includes a front optical system G1 and a back optical system G2, disposed in this order along the optical axis direction from the front side, and a lens driving part 23 that moves these optical systems G1 and G2 relative to each other in the optical axis direction.

The front optical system G1 and the back optical system G2 have focal lengths of different sign but substantially equal absolute value.

In the example shown in FIG. 2, the front optical system G1 is a biconvex lens L1, and the back optical system G2 is formed of a biconcave lens L21 and a compound lens L22. The compound lens L22 is formed by combining a biconvex lens L221 and a meniscus lens L222.

The following conditional expressions are satisfied in this embodiment.

$$Hb1 - Hf2 > 0 \quad (1)$$

Here, Hb1 is the back principal point of the front optical system G1, and Hf2 is the front principal point of the back optical system G2.

The operation of the thus-configured focus-adjusting unit 1 according to this embodiment will be described below.

To perform observation of the specimen A using the microscope 2, with the tip of the objective optical system 12 in close contact with the specimen A, laser light is emitted from the laser light source 3, and the laser light guided to the microscope main body 6 via the optical fiber 5 is deflected by the dichroic mirror 8, is two-dimensionally scanned by the proximity galvanometer mirrors 9, and is radiated onto the specimen A via the pupil-projection optical system 10, the image-forming optical system 11, the focus-adjusting unit 1, and the objective optical system 12.

Fluorescence is generated by exciting a fluorescent substance in the specimen A irradiated with the laser light, and the generated fluorescence is collected by the objective optical system 12, returns via the focus-adjusting unit 1, the image-forming optical system 11, the pupil-projection optical system 10, and the proximity galvanometer mirrors 9, is transmitted through the dichroic mirror 8 to be focused onto the end of the optical fiber 14 by the coupling optical system 13, is guided by the optical fiber 14, and is then detected by the detection optical system 15.

In this case, for example, when the back optical system G2 is moved in the optical axis direction by the lens driving part 23, the working distance of the objective optical system 12 (the focusing distance with reference to the tip of the objective optical system) changes.

Therefore, it is possible to observe images at a desired depth inside the specimen without moving the objective optical system 12. Also, if a plurality of images are acquired while moving the back optical system G2, a three-dimensional image of the specimen A can be obtained.

In this case, with the focus-adjusting unit 1 according to this embodiment, because the focal lengths of the front optical system G1 and the back optical system G2 are set to have opposite sign but equal absolute values, by changing the distance between the two optical systems G1 and G2 by operating the lens driving part 23, even though the working distance of the objective optical system 12 changes, its observation magnification does not change.

Also, because expression (1) above is satisfied, an advantage is afforded in that interference between the two optical systems G1 and G2 can be avoided even when they move relative to each other.

According to this embodiment, because the front optical system G1 is constructed of the biconvex lens L1 having a positive focal length, and the back optical system G2 is constructed of the compound lens L22 and the biconcave lens L21 having a negative focal length, the distance between the front focal point of the front optical system G1 and the back focal point of the objective optical system 12 can be reduced, which allows the change in magnification during focus adjustment to be reduced.

In addition, because the back optical system G2 includes the compound lens L22 formed of the biconvex lens L221 and the meniscus lens L222, an advantage is afforded in that chromatic aberrations can be reduced with the compound lens L22.

In this embodiment, the biconvex lens L1 is used as the front optical system G1, but it is not limited thereto. For example, as shown in FIG. 10, the focus-adjusting unit 1 may be constructed of a compound lens L1' formed of a biconvex lens L11 and a meniscus lens L12.

Figure 10:
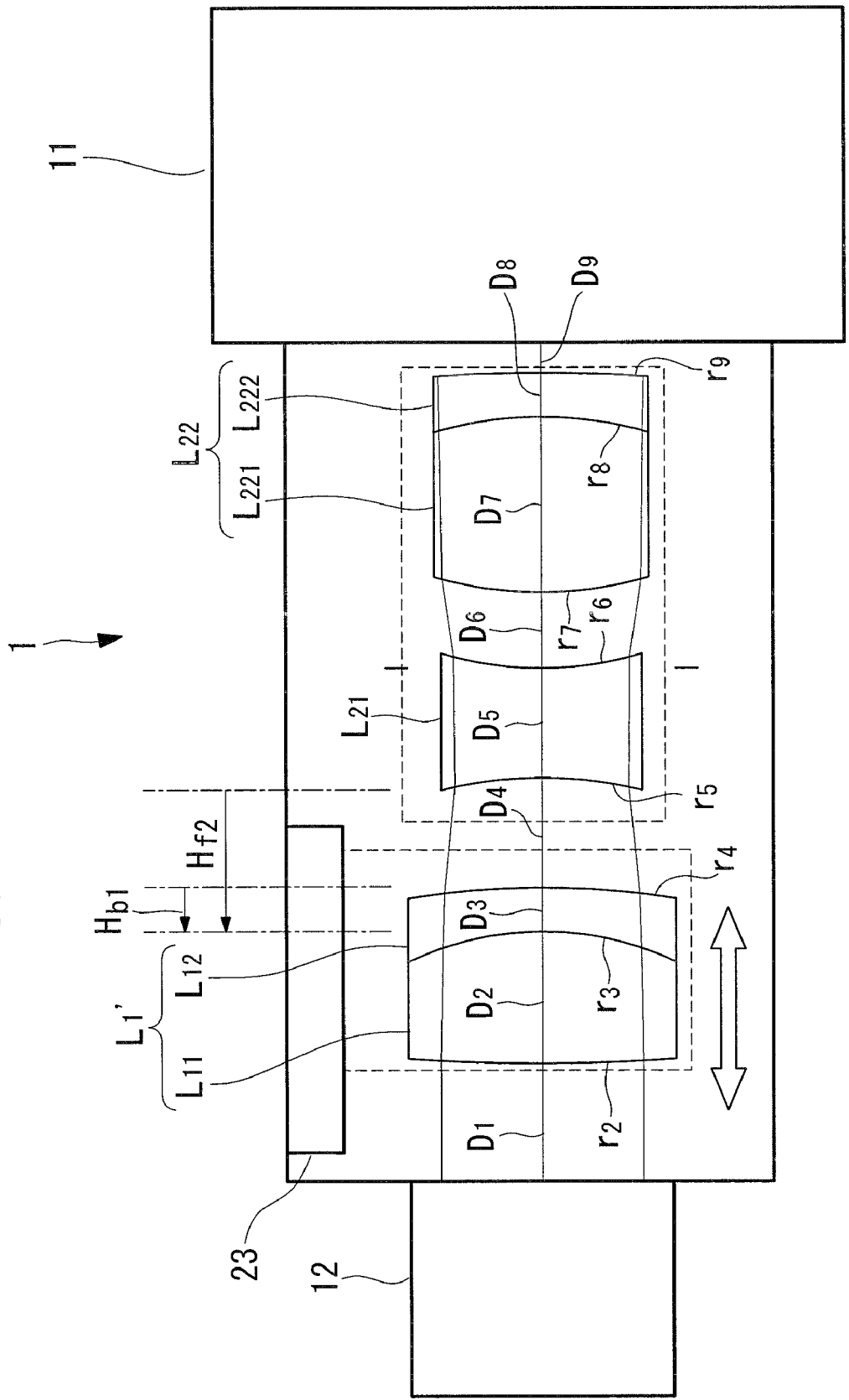
FIG. 10 is a diagram showing a focus-adjusting unit according to Example 2 of this embodiment.

Although the back optical system G2 is moved relative to the front optical system G1 by the lens driving part 23, the front optical system G1 may be moved relative to the back optical system G2, as shown in FIG. 10, or both optical systems G1 and G2 may be moved relatively.

EXAMPLES

Example 1

A first Example of the focus-adjusting unit 1 according to this embodiment will be described below with reference to FIGS. 2 to 9.

As shown in FIG. 2, the focus-adjusting unit 1 according to this Example includes the front optical system G1 formed of the biconvex lens L1, and the back optical system G2 formed of the biconcave lens L21 and the compound lens L22. The lens data for each lens is shown in Table 1. The working distance is changed by varying inter-lens distances D3 and D5, indicated by the * symbols in Table 1.

TABLE 1

| S | R | D | nd | ν | group |
|---|---|---|---|---|---|
| 1 (abutting objective optical system) | ∞ (virtual plane) | 7.00 | | | |
| 2 | 120.031 | 7.87 | 1.48749 | 70.23 | G1 |
| 3 | −20.102 | 5.99(*) | | | |
| 4 | −13.893 | 5.00 | 1.48749 | 70.23 | G2n |
| 5 | 13.893 | 5.19 | | | |
| 6 | 17.008 | 8.00 | 1.43875 | 94.93 | G2p |
| 7 | −20.879 | 2.00 | 1.48749 | 70.23 | G2p |
| 8 | −73.091 | −3.00(*) | | | |
| 9 (abutting image-forming optical system) | ∞ (virtual plane) | | | | |

In Table 1 (the same applies to each of the tables in the following), S is the surface number, R is the radius of curvature, D is the distance between surfaces, nd is the refractive index at the d-line, and ν is the Abbe number.

Figure 3:
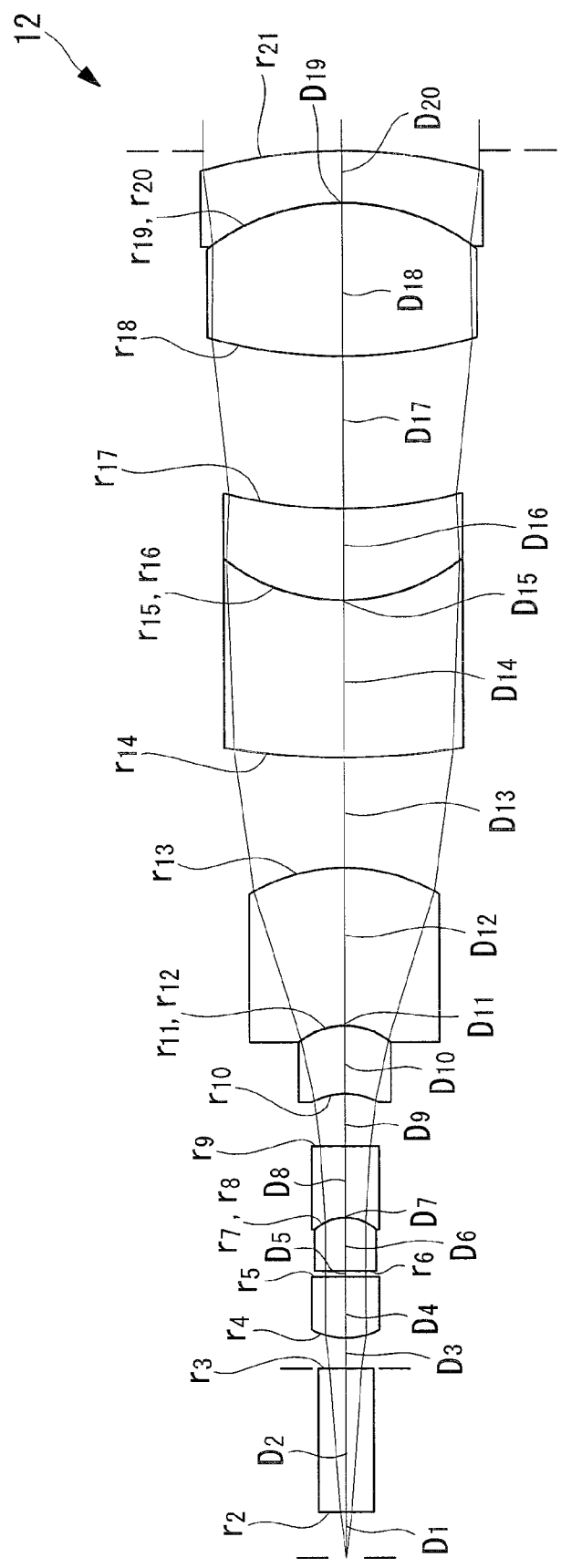
FIG. 3 is a diagram showing an example lens arrangement of an objective optical system provided in the microscope in FIG. 1.
Figure 4:
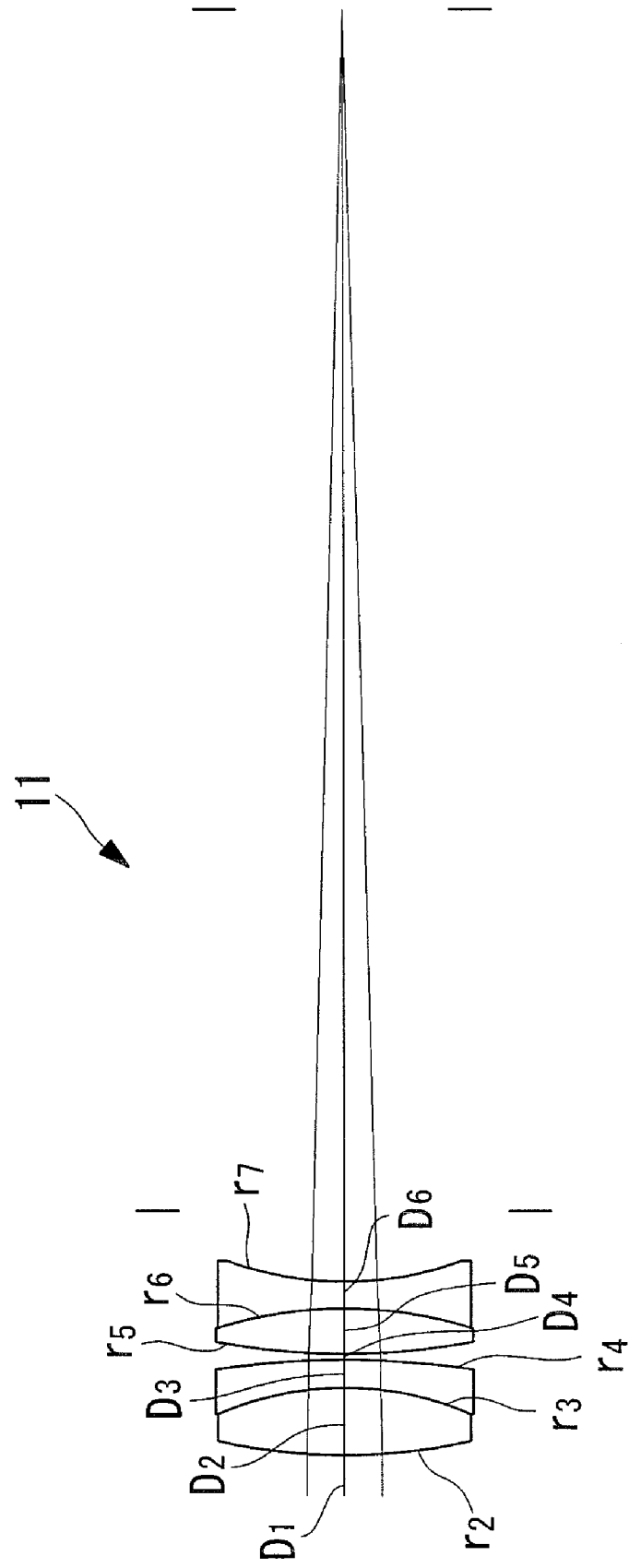
FIG. 4 is a diagram showing an example lens arrangement of an image-forming optical system provided in the microscope in FIG. 1.
Figure 5:
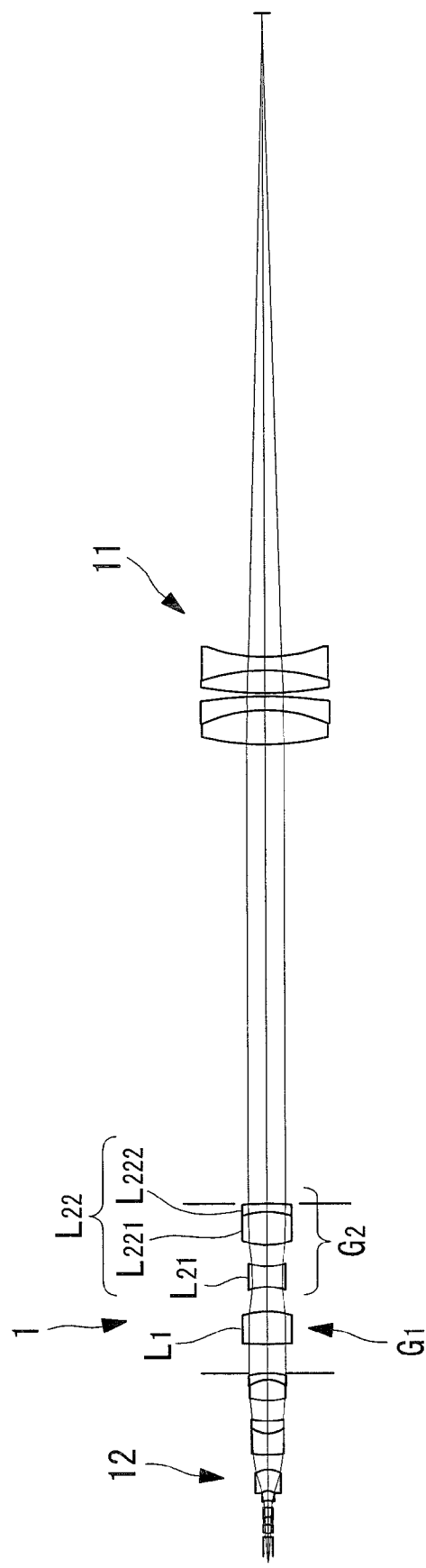
FIG. 5 is a diagram showing a lens arrangement combining the focus-adjusting unit in FIG. 2, the objective optical system in FIG. 3, and the image-forming optical system in FIG. 4.

The objective optical system 12 and the image-forming optical system 11 mounted to the focus-adjusting unit 1 according to this Example are shown in FIGS. 3 and 4, and the lens data for the optical systems 11 and 12 is shown in Tables 2 and 3 . FIG. 5 shows the focus-adjusting unit 1 disposed between the objective optical system 12 and the image-forming optical system 11.

TABLE 2

| S | R | D | nd | ν |
|---|---|---|---|---|
| 1 (object plane) | ∞ (virtual plane) | 1.52 | | |
| 2 | ∞ | 4.67 | 1.7725 | 49.6 |
| 3 | ∞ | 1.00 | | |
| 4 | 2.385 | 2.00 | 1.43875 | 94.93 |
| 5 | ∞ | 0.20 | | |
| 6 | ∞ | 1.73 | 1.43875 | 94.93 |
| 7 | −1.462 | 0.01 | 1.56444 | 43.79 |
| 8 | −1.462 | 2.34 | 1.6779 | 55.34 |
| 9 | ∞ | 1.70 | | |
| 10 | −2.339 | 2.23 | 1.43875 | 94.93 |
| 11 | −2.339 | 0.01 | 1.56444 | 43.79 |
| 12 | −2.339 | 5.17 | 1.7725 | 49.6 |
| 13 | −6.021 | 3.63 | | |
| 14 | 24.102 | 5.16 | 1.51633 | 64.14 |
| 15 | 6.202 | 0.01 | 1.56444 | 43.79 |
| 16 | 6.202 | 3.00 | 1.6779 | 55.34 |
| 17 | 15.002 | 5.00 | | |
| 18 | 16.326 | 5.00 | 1.43875 | 94.93 |
| 19 | −7.205 | 0.01 | 1.56444 | 43.79 |
| 20 | −7.205 | 1.70 | 1.7725 | 49.6 |
| 21 | −16.508 | 3.00 | | |
| 22 (abutting objective optical system) | ∞ (virtual plane) | | | |

TABLE 3

| S | R | D | nd | ν |
|---|---|---|---|---|
| 1 (abutting image-forming optical system) | ∞ (virtual plane) | 119.00 | | |
| 2 | 68.7541 | 8.26 | 1.48749 | 70.21 |
| 3 | −37.5679 | 3.44 | 1.8061 | 40.95 |
| 4 | −102.848 | 0.74 | | |
| 5 | 84.3099 | 5.56 | 1.834 | 37.17 |
| 6 | −50.71 | 3.30 | 1.6445 | 40.82 |
| 7 | 40.6619 | | | |

Here, the amount of change in the working distance of the objective optical system 12, ZWD, and the lateral magnification, M, can be calculated from the approximations shown below.

$$ZWD = -n \cdot \delta \cdot (Fob/Fg1)^2$$

$$M = (Ft1/Fob) \cdot (Fg1/Fg2)$$

Here, n is the refractive index between the observation plane and the tip of the objective optical system 12, Fob is the focal length of the objective optical system 12, Ft1 is the focal length of the image-forming optical system 11, Fg1 is the focal length of the front optical system G1, Fg2 is the focal length of the back optical system G2, and δ is the relative change in position of the back optical system G2 with respect to the front optical system G1.

Figure 6:
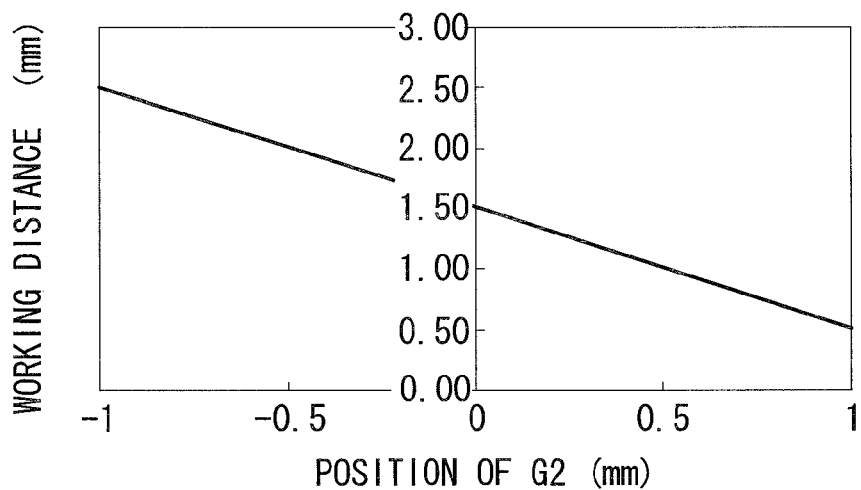
FIG. 6 is a graph showing the relationship between working distance and the position of a back optical system of the focus-adjusting unit in FIG. 2.
Figure 7:
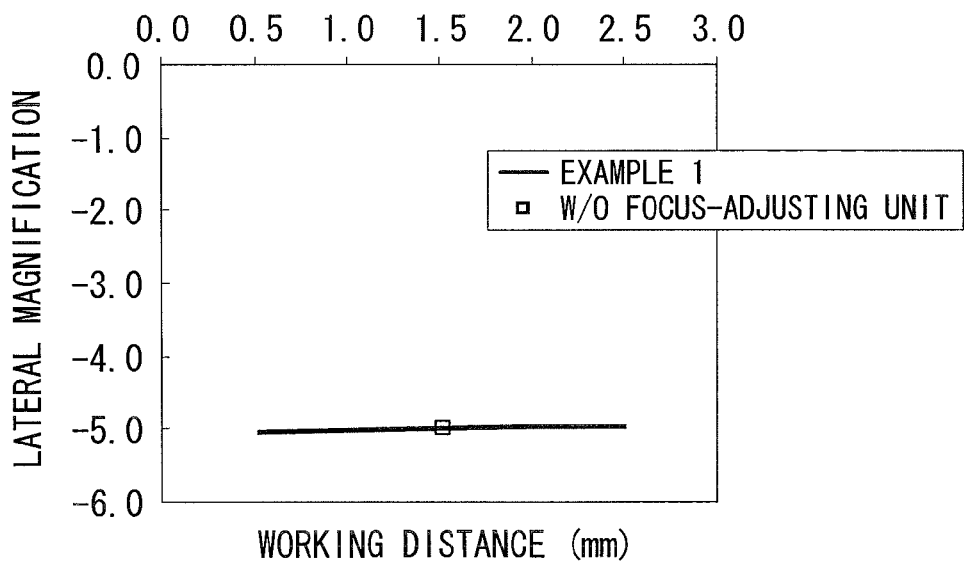
FIG. 7 is a graph showing the relationship between working distance and lateral magnification of the focus-adjusting unit in FIG. 2.
Figure 8A:
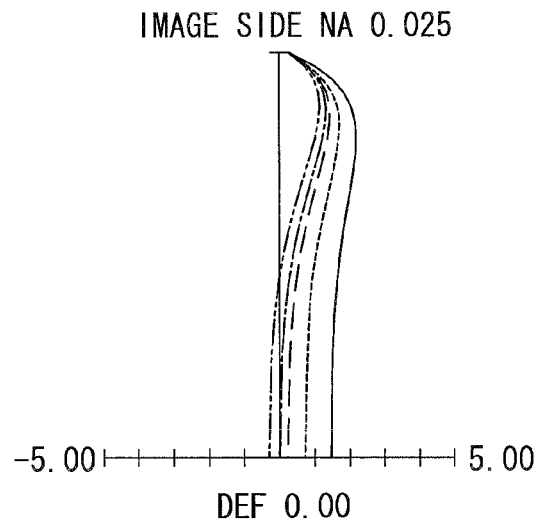
FIG. 8A is a diagram showing spherical aberration with the lens arrangement in FIG. 5.
Figure 8B:
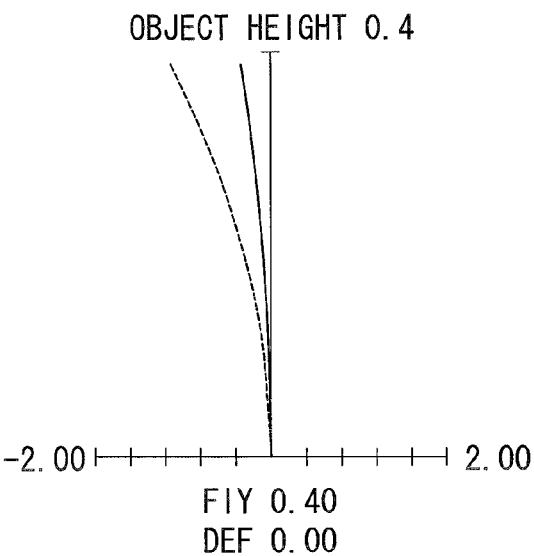
FIG. 8B is a diagram showing astigmatism with the lens arrangement in FIG. 5.
Figure 8C:
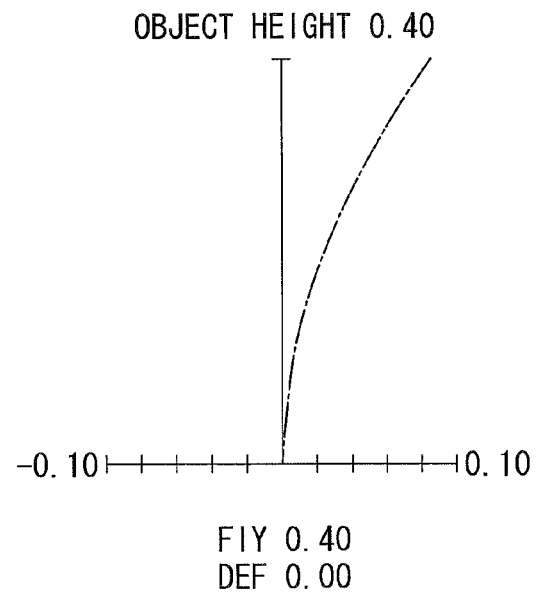
FIG. 8C is a diagram showing distortion with the lens arrangement in FIG. 5.
Figure 8D:
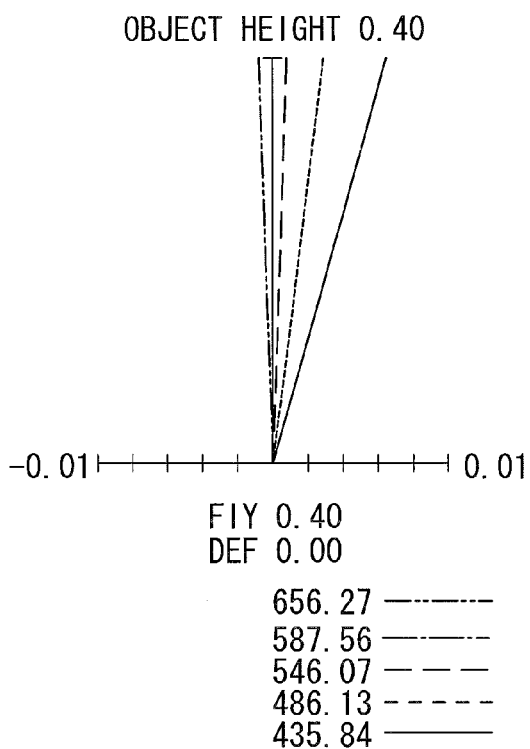
FIG. 8D is a diagram showing chromatic aberration of magnification with the lens arrangement in FIG. 5.
Figure 9A:
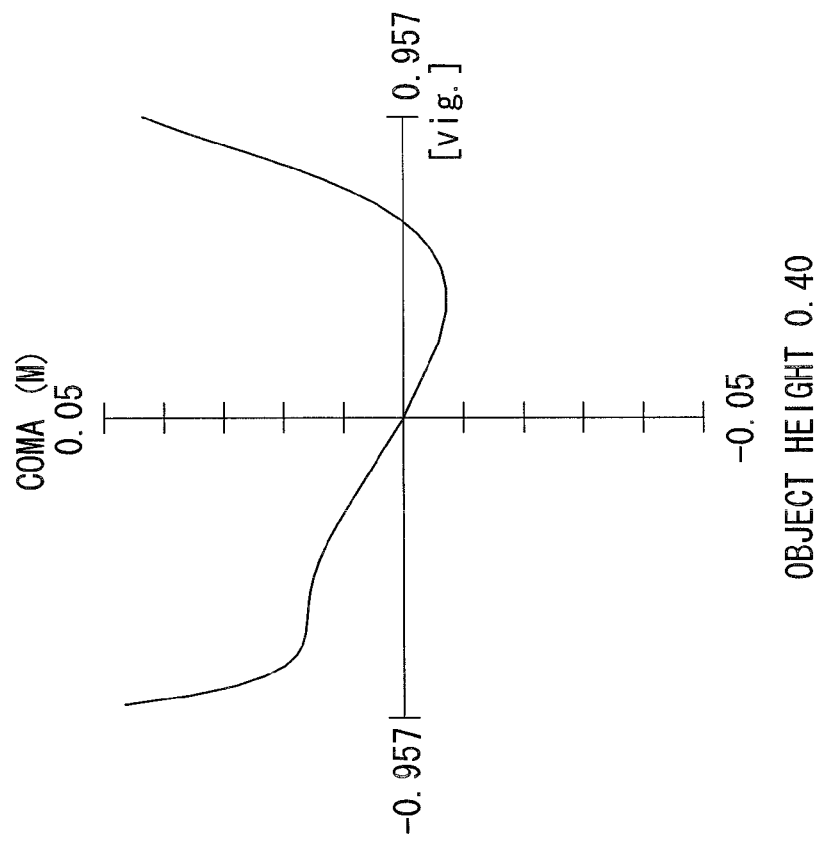
FIG. 9A is a diagram showing coma (M: meridional plane) with the lens arrangement in FIG. 5.
Figure 9B:
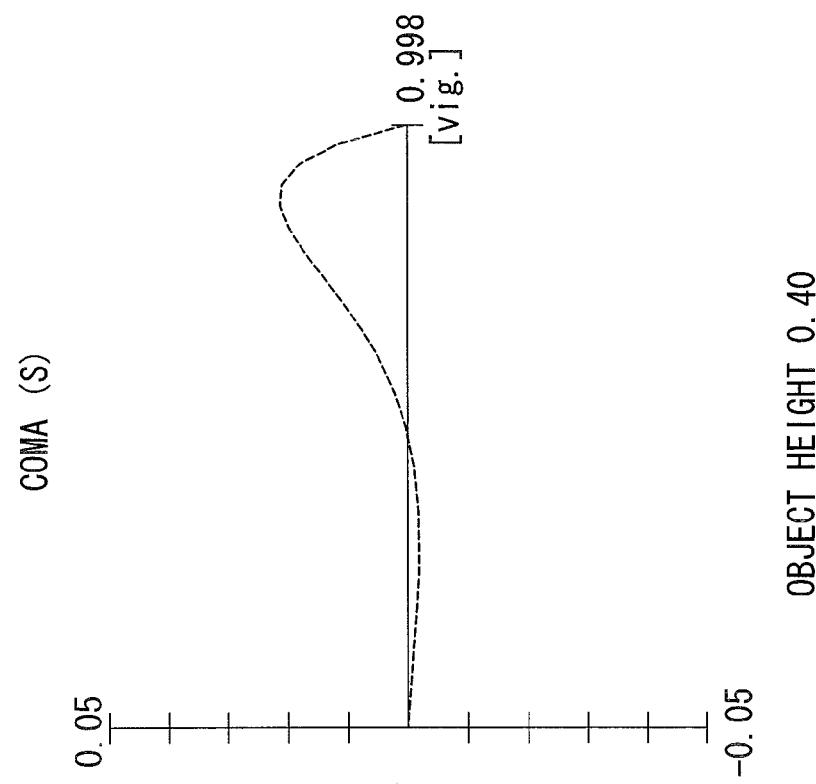
FIG. 9B is a diagram showing coma (S: sagittal plane) with the lens arrangement in FIG. 5.

The focal lengths and principal points of the front optical system G1 and the back optical system G2 in the focus-adjusting unit 1 according to this Example, as well as the value of conditional expression (1), are shown in Table 4. The relationship between the working distance and the amount of movement of the back optical system G2 is shown in FIG. 6, and the relationship between the working distance and the lateral magnification is shown in FIG. 7 and Table 5.

TABLE 4

| G1 focal length | 35.98 |
|---|---|
| G2 focal length | −35.97 |

TABLE 4-continued

| Hb1 | −0.77 |
|---|---|
| Hf2 | −6.75 |
| condition (1) | 5.98 |

TABLE 5

| amount of movement of G2 | WD | lateral magnification |
|---|---|---|
| −1 | 2.51 | −4.96 |
| 0 | 1.52 | −5.00 |
| 1 | 0.51 | −5.04 |
| WD and lateral magnification for OB and TL only | | |
| OB + TL | 1.52 | −5.0 |

According to this Example, the conditional expression (1) is satisfied, as shown in Table 4, and even if the front optical system G1 and the back optical system G2 are moved relative to each other, the two optical systems G1 and G2 do not interfere.

Additionally, as shown in FIG. 6, even though the working distance changes when moving the back optical system G2, it is possible to ensure that the lateral magnification does not change. As shown in FIG. 7 and Table 5, even if the working distance changes when moving the back optical system G2, the lateral magnification M thereof can reach the same value as when the focus-adjusting unit 1 is not used, that is, when the objective optical system 12 is directly coupled to the image-forming optical system 11.

With the focus-adjusting unit 1 according to this embodiment, positive refractive power is conferred by the convex surfaces of the biconvex lens L1, spherical aberration and coma produced at the biconvex lens L1 are corrected with the concave surface of L21, and chromatic aberration and spherical aberration can be corrected with good balance at the compound lens L22. As shown in FIGS. 8A to 8D and FIGS. 9A and 9B, chromatic aberration is corrected by including the compound lens L22 in the back optical system G2, and spherical aberration and coma are corrected by providing the back optical system G2 with the biconvex lens L21.

With the focus-adjusting unit 1 according to this embodiment, conditional expressions (2) and (3) below are satisfied.

$$\nu 3 - \nu 4 > 20 \quad (2)$$

$$0.02 < n3 - n4 < 0.1 \quad (3)$$

Here, ν3 and ν4 are the Abbe numbers of the biconvex lens and the meniscus lens in the above-mentioned positive lens group, and n3 and n4 are the d-line refractive indexes of the biconvex lens and the meniscus lens in the positive lens group.

Chromatic aberrations are sufficiently corrected by satisfying conditional expression (2). When the value is 20 or less, the chromatic aberrations cannot be sufficiently corrected.

Chromatic aberrations and spherical aberrations can be balanced by satisfying conditional expression (3). When the value is 0.02 or less, the spherical aberrations are undercorrected when the chromatic aberrations are properly corrected. If the value is 0.1 or above, the spherical aberrations are overcorrected when the chromatic aberrations are properly corrected.

Example 2

Next, a second Example of the focus-adjusting unit 1 according to this embodiment will be described with reference to the drawings.

As shown in FIG. 10, the focus-adjusting unit 1 according to this Example includes the front optical system G1, which is formed of the compound lens L1' combining the biconvex lens L11 and the meniscus lens L12, and the back optical system G2 formed of a biconvex lens L21 and a compound lens L22. The lens data for each of the lenses is shown in Table 6. The working distance is changed by varying the inter-lens distances D1 and D4, shown by the * symbols in Table 6.

TABLE 6

| S | R | D | nd | γ | group |
|---|---|---|----|---|-------|
| 1 (abutting objective optical system) | ∞ (virtual plane) | 7.00(*) | | | |
| 2 | 82.9515 | 6.00 | 1.48749 | 70.23 | G1p |
| 3 | −13.7082 | 2.00 | 1.43875 | 94.93 | G1p |
| 4 | −36.7989 | 4.97(*) | | | |
| 5 | −18.3753 | 5.00 | 1.48749 | 70.23 | G2n |
| 6 | 15.3383 | 3.46 | | | |
| 7 | 16.7093 | 8.00 | 1.48749 | 70.23 | G2 |
| 8 | −16.7093 | 2.00 | 1.48749 | 70.23 | G2 |
| 9 | −69.95 | −3.00 | | | |
| 10 (abutting image-forming optical system) | ∞ (virtual plane) | | | | |

Figure 11:
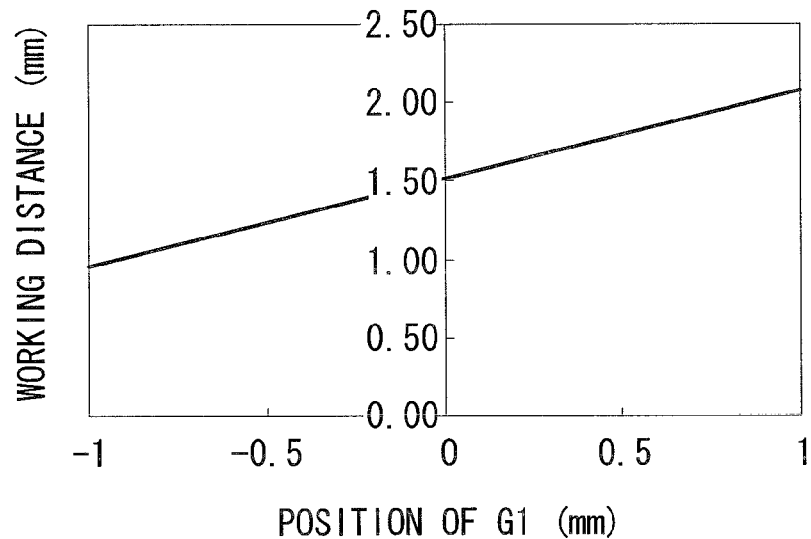
FIG. 11 is a graph showing the relationship between working distance and the position of a front optical system of the focus-adjusting unit in FIG. 10.
Figure 12:
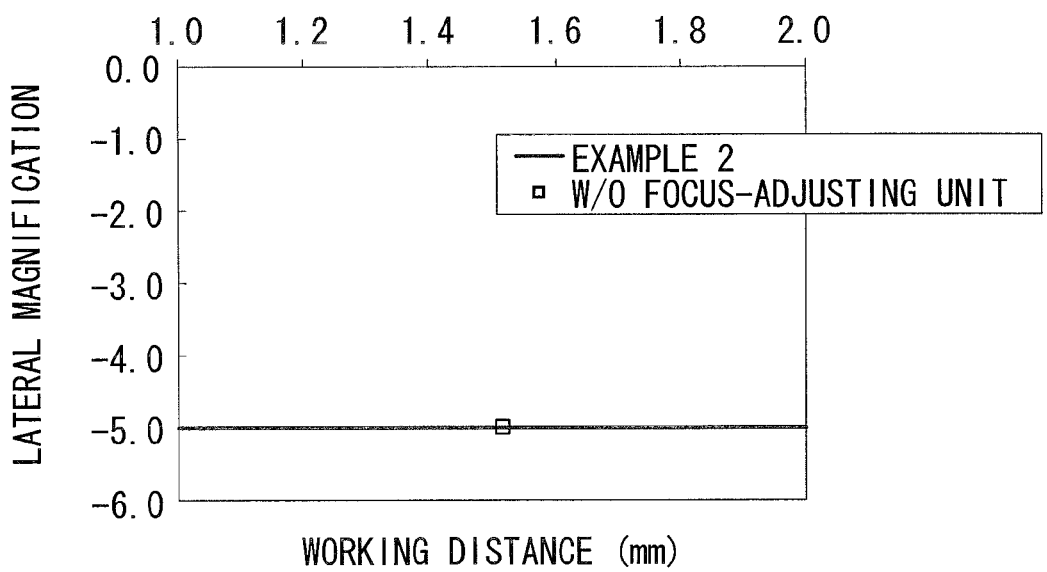
FIG. 12 is a graph showing the relationship between working distance and lateral magnification of the focus-adjusting unit in FIG. 10.

The focal lengths and principal points of the front optical system G1 and the back optical system G2 in the focus-adjusting unit 1 in this Example, as well as the values of conditional expression (1), are shown in Table 7. The relationship between the working distance and the amount of movement of the front optical system G1 in the case where the focus-adjusting unit 1 is combined with the objective optical system 12 and the image-forming optical system 11 in FIGS. 3 and 4 is shown in FIG. 11, and the relationship between the working distance and the lateral magnification is shown in FIG. 12 and Table 8.

TABLE 7

| G1 focal length | 48.00 |
|---|---|
| G2 focal length | −48.03 |
| Hb1 | −1.76 |
| Hb2 | −6.76 |
| condition (1) | 5.00 |

TABLE 8

| Position of G1 | WD | Lateral magnification |
|---|---|---|
| −1 | 0.96 | −5.00 |
| 0 | 1.52 | −5.00 |
| 1 | 2.08 | −5.00 |
| WD and lateral magnification for OB and TL only | | |
| OB + TL | 1.52 | −5.0 |

According to this Example, the conditional expression (1) is satisfied, as shown in Table 7, and even if the front optical system G1 and the back optical system G2 move relative to each other, the two optical systems G1 and G2 do not interfere. Additionally, as shown in FIG. 11, even though the working distance changes when moving the front optical system G1, it is possible to ensure that the lateral magnification does not change. As shown in FIG. 12 and Table 8, even though the working distance changes when moving the front optical system G1, the lateral magnification M thereof can reach the same value as when the focus-adjusting unit 1 is not used, that is, when the objective optical system 12 is directly coupled to the image-forming optical system 11.

Figure 14A:
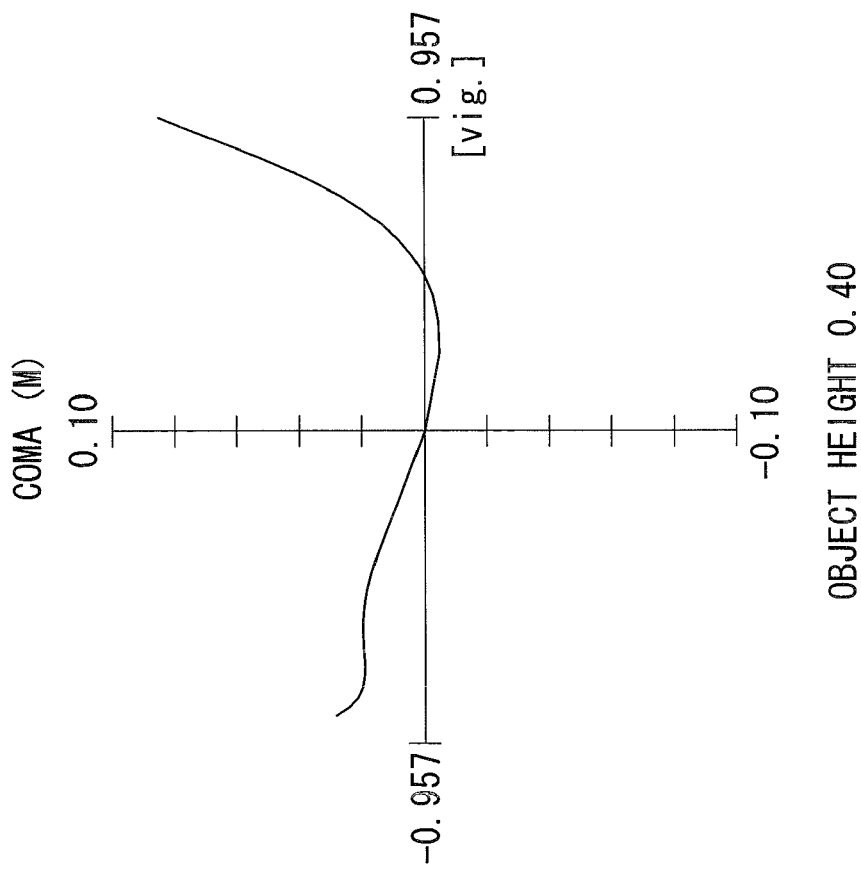
FIG. 14A is a diagram showing coma (M: meridional plane) with the lens arrangement of the focus-adjusting unit according to Example 2 of this embodiment.
Figure 14B:
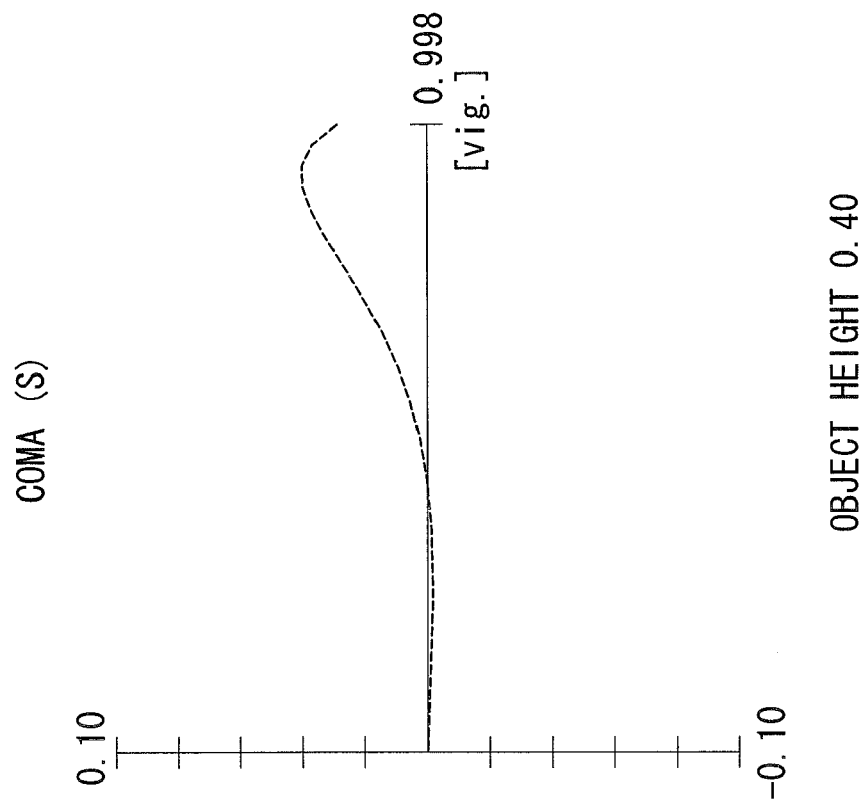
FIG. 14B is a diagram showing coma (S: sagittal plane) with the lens arrangement of the focus-adjusting unit according to Example 2 of this embodiment.

With the focus-adjusting unit 1 according to this embodiment, as shown in FIGS. 13 and 14, chromatic aberration is corrected by including the compound lens L22 in the back optical system G2. Also, spherical aberration and coma are corrected by providing the back optical system G2 with the biconcave lens L21.

What is claimed is:

1. A focus-adjusting unit disposed on an optical axis between an objective optical system that collects light from a specimen and an image-forming optical system that images the light collected by the objective optical system at a prescribed position, comprising a front optical system and a back optical system, sequentially disposed along the optical axis direction from a front side, with the objective optical system at the front side and the image-forming optical system at a back side; and a lens driving part that relatively moves the front optical system and the back optical system in the optical axis direction, wherein the front optical system and the back optical system have focal lengths of different sign and focal lengths of substantially equal absolute value, and wherein conditional expression (1) below is satisfied:

$$Hb1 \times Hf2 > 0 \quad (1)$$

Where Hb1 is a back principal point of the front optical system and Hf2 is a front principal point of the back optical system.

2. A focus-adjusting unit according to claim 1, wherein the front optical system has a positive focal length, and the back optical system has a negative focal length; and the back optical system comprises a negative lens group having a negative refractive power and a positive lens group having a positive refractive power, disposed in sequence along the optical axis direction from the front side.

3. A focus-adjusting unit according to claim 2 wherein, at least one of the front optical system and the positive lens group is a compound lens formed by combining a meniscus lens and a positive lens having positive refractive power.

4. A focus-adjusting unit according to claim 2, wherein:
the front optical system is a biconvex lens;
the negative lens group is a biconcave lens;
the positive lens group is a compound lens formed of a biconvex lens and a meniscus lens; and
the following conditional expressions (2) and (3) are satisfied:

$$v3 - v4 > 20 \quad (2)$$

$$0.02 < n3 - n4 < 0.1 \quad (3)$$

where $v3$ and $v4$ are Abbe numbers of the biconvex lens and the meniscus lens in the positive lens group, and $n3$ and $n4$ are d-line refractive indexes of the biconvex lens and the meniscus lens in the positive lens group.

5. A microscope comprising the focus-adjusting unit according to claim 1.

* * * * *